United States Patent
Wang et al.

(10) Patent No.: US 10,218,461 B2
(45) Date of Patent: Feb. 26, 2019

(54) WIRELESS COMMUNICATION METHOD, ENODEB, AND USER EQUIPMENT

(71) Applicant: Panasonic Intellectual Property Corporation of America, Torrance, CA (US)

(72) Inventors: Lilei Wang, Beijing (CN); Hidetoshi Suzuki, Kanagawa (JP); Masayuki Hoshino, Kanagawa (JP); Li Wang, Beijing (CN)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 4 days.

(21) Appl. No.: 15/029,239

(22) PCT Filed: Oct. 31, 2013

(86) PCT No.: PCT/CN2013/086367
§ 371 (c)(1),
(2) Date: Apr. 13, 2016

(87) PCT Pub. No.: WO2015/062051
PCT Pub. Date: May 7, 2015

(65) Prior Publication Data
US 2016/0254878 A1    Sep. 1, 2016

(51) Int. Cl.
*H04L 1/00* (2006.01)
*H04L 5/00* (2006.01)
(Continued)

(52) U.S. Cl.
CPC .......... *H04L 1/0046* (2013.01); *H04L 5/0053* (2013.01); *H04W 48/12* (2013.01); *H04W 72/042* (2013.01); *H04W 72/0406* (2013.01)

(58) Field of Classification Search
CPC ... H04L 1/0046; H04L 5/0053; H04L 1/0027; H04W 48/12; H04W 72/042;
(Continued)

(56) References Cited

U.S. PATENT DOCUMENTS 8,520,621 B2    8/2013  Tee et al.
9,420,609 B2    8/2016  Abe et al.
(Continued)

FOREIGN PATENT DOCUMENTS

CN    102265677 A      11/2011
JP    2012-235360 A    11/2012
WO    2013/013394 A1   1/2013

OTHER PUBLICATIONS

3GPP TS 36.212 V11.3.0, 3$^{rd}$ Generation Partnership Project; Technical Specification Group Radio Access Network; Evolved Universal Terrestrial Radio Access (E-UTRA); Multiplexing and channel coding (Release 11), Jun. 2013, 84 pages.
(Continued)

*Primary Examiner* — Kwang B Yao
*Assistant Examiner* — Hardikkumar D Patel
(74) *Attorney, Agent, or Firm* — Seed IP Law Group (57) ABSTRACT

The present disclosure provides a wireless communication method and an eNode B and user equipment therefor. The wireless communication method performed by the eNB comprises steps of transmitting a first downlink control information (DCI) to a UE in a first physical downlink control channel (PDCCH) candidate or enhanced PDCCH (EPDCCH) candidate; and transmitting a second DCI to the UE in a second PDCCH candidate or EPDCCH candidate, wherein the assignment of the second PDCCH candidate or EPDCCH candidate is determined based on the assignment of the first PDCCH candidate or EPDCCH candidate according to a predefined algorithm configured through radio
(Continued)

resource control (RRC) signaling or fixed by specification. According the present disclosure, the BD trials for DCIs can be reduced.

19 Claims, 3 Drawing Sheets

(51) Int. Cl.
*H04W 48/12* (2009.01)
*H04W 72/04* (2009.01)

(58) Field of Classification Search
CPC ............ H04W 72/0406; H04W 72/04; H04W 72/046; H04W 48/16; H04W 72/0426; H04J 11/0053; H04B 7/0639; H04B 7/0452
See application file for complete search history.

(56) References Cited

U.S. PATENT DOCUMENTS

| | | | |
|---|---|---|---|
| 2010/0054358 A1* | 3/2010 | Ko | H04B 7/0639 375/267 |
| 2011/0274066 A1 | 11/2011 | Tee et al. | |
| 2012/0155316 A1* | 6/2012 | Li | H04W 48/16 370/252 |
| 2012/0307759 A1 | 12/2012 | Miki | |
| 2013/0155872 A1* | 6/2013 | Subramanian | H04W 24/06 370/242 |
| 2013/0163551 A1* | 6/2013 | He | H04W 4/70 370/329 |
| 2013/0343311 A1 | 12/2013 | Tee et al. | |
| 2014/0092830 A1* | 4/2014 | Chen | H04W 72/042 370/329 |
| 2014/0133440 A1 | 5/2014 | Zhang et al. | |
| 2014/0192759 A1* | 7/2014 | Son | H04W 72/0426 370/329 |
| 2014/0301286 A1 | 10/2014 | Abe et al. | |
| 2015/0229454 A1* | 8/2015 | Takeda | H04W 72/042 370/329 |
| 2016/0278056 A1 | 9/2016 | Abe et al. | |

OTHER PUBLICATIONS

3GPP TS 36.213 V11.4.0, 3$^{rd}$ Generation Partnership Project; Technical Specification Group Radio Access Network; Evolved Universal Terrestrial Radio Access (E-UTRA); Physical layer procedures (Release 11), Sep. 2013, 182 pages.
International Search Report dated May 6, 2014, for corresponding International Application No. PCT/CN2013/086367, 2 pages.
Panasonic, "Signalling mechanisms for interference information," R1-134380, 3GPP TSG RAN WG1 Meeting #74bis, Agenda Item: 7.2.10.3, Guangzhou, China, Oct. 7-11, 2013, 3 pages.
Research in Motion UK Limited, "Bling Decoding for Carrier Aggregation," R1-100566, 3GPP TSG RAN WG1 Meeting #59bis, Agenda Item: 7.1.5, Valencia, Spain, Jan. 18-22, 2010, 3 pages.

* cited by examiner

WIRELESS COMMUNICATION METHOD, ENODEB, AND USER EQUIPMENT

TECHNICAL FIELD

The present disclosure relates to the field of wireless communication, and in particular, to a wireless communication method for communicating Downlink Control Information (DCI), and an eNode B (eNB) and user equipment (UE) therefor.

BACKGROUND

In wireless communication, it may be necessary to transmit more than one DCI. For example, for NAICS (Network-Assisted Interference Cancellation and Suppression), a new DCI is needed to indicate interference. NAICS is SI (Study Item) in LTE (Long Term Evolution) Rel.12 and targeted to realize advanced receiver to cancel/suppress interference in UE side by assistance of network signaling. The main task of NAICS SI is to investigate an enhanced receiver with network-assistant for mitigating the co-channel interference coming from inter-cell, intra-cell, or inter-stream.

In NAICS, with the help of eNB indication, an advanced receiver at UE could estimate the effective channel of the interference signal, demodulate the interference signal, and decode the interference signal. For purpose of cancelling/suppressing interfering signals, the advanced receiver at UE should obtain the necessary information about interfering signals through indication from network for channel estimation/demodulation/decoding.

As interference could be a dynamically scheduled signal of interfering cell, such interference indication could be a unicast indication of L1 signaling (e.g., Physical Downlink Control Channel (PDCCH) or enhanced PDCCH (EPDCCH)) from serving cell if backhaul is ideal, while some long-term information, such as cell-specific information, can be signaled by Radio Resource Control (RRC). Some interference parameters, which probably need a certain degree of scheduling restriction in serving/neighbor cell or more decoding complexity in victim UE, can also be blind detected by victim UE. For example, PhysCellID (PCI) of neighbor cell can also be detected by cell search procedure instead of RRC signaling, RB (Resource Block) allocation of DMRS (Demodulation Reference Signal)-based transmission mode (TM) interference can also be detected by checking correlation of DMRS with very restricted number instead of by L1 signaling, and modulation order can also be blind tried by receiver instead of explicit indication.

Blind detection/try will either require more processing complexity on victim UE or reduce the system performance by limiting the flexibility of scheduling. Therefore, for NAICS system design, it needs to strike a balance between UE complexity and system performance (signaling overhead and/or scheduling flexibility). Moreover, some parameters cannot be blind detected/tried in an acceptable performance loss or complexity, e.g., TPMI (Transmitted Precoding Matrix Indicator) and RB allocation of CRS (Cell-Specific Reference Signal)-based TM, and L1 signaling for such information is more proper. It is noted that, in this disclosure, the information to be transmitted in L1 signaling is not limited to the above, but any information which can be indicated through L1 signaling is included.

As BD (blind decoding) is used for L1 signaling, the BD procedure can be introduced below by using PDCCH as an example.)

Search space: number of candidates per aggregation level (AL)
  UE-specific search space (USS): total is 16 (6/AL1, 6/AL2, 2/AL4, 2/AL8)
  Common search space (CSS): total is 6 (4/AL4, 2/AL8))
Number of DCI formats monitored:
  USS: 2 [3, if DCI format 4 is supported]
  CSS: 2
Total BD trials: number of candidates×number of DCI formats monitored:
  USS: 32 [48, if DCI format 4 is supported]; CSS: 12.

When a second DCI (e.g., a new DCI for interference indication) is transmitted in for example USS together with a first DCI (e.g., a traditional DCI for allocating resource to UE), the total BD trials will be increased. For example, if a new DCI for interference indication is transmitted with a traditional DCI, the DCI format number in USS could be increased from 2 to 3 (from 3 to 4, if DCI format 4 is supported). The total BD trials in USS are increased by 50% (33%, if DCI format 4 is supported), and thus the increased number of BD trials is at most 16. The problem of the traditional way is that BD receiver would need 150% (133%, if DCI format 4 is supported) of decoding capability to keep the decoding delay unchanged (which is a large modification in UE chipset) or BD receiver would result in 150% (133%, if DCI format 4 is supported) of decoding delay if the decoding capability remains the same (resulting in less time left for PDSCH decoding especially for EPDCCH indication). Therefore, how to reduce the additional BD trials introduced by the second DCI is very important for realistic implementation.

SUMMARY OF THE DISCLOSURE

The present disclosure is made in view of the above in order to reduce the BD trials for DCIS.

In a first aspect of the present disclosure, there is provided a wireless communication method performed by an eNode B (eNB), comprising steps of: transmitting a first downlink control information (DCI) to a user equipment (UE) in a first physical downlink control channel (PDCCH) candidate or enhanced PDCCH (EPDCCH) candidate; and transmitting a second DCI to the UE in a second PDCCH candidate or EPDCCH candidate, wherein the assignment of the second PDCCH candidate or EPDCCH candidate is determined based on the assignment of the first PDCCH candidate or EPDCCH candidate according to a predefined algorithm configured through radio resource control (RRC) signaling or fixed by specification.

In a second aspect of the present disclosure, there is provided a wireless communication method performed by a user equipment (UE), comprising steps of: detecting a first downlink control information (DCI) transmitted from an eNode B (eNB) in a first physical downlink control channel (PDCCH) candidate or enhanced PDCCH (EPDCCH) candidate; determining the assignment of a second PDCCH candidate or EPDCCH candidate used by the eNB to transmit a second DCI based on the assignment of the first PDCCH candidate or EPDCCH candidate according to a predefined algorithm configured through radio resource control (RRC) signaling or fixed by specification; and detecting the second DCI transmitted from the eNB in the second PDCCH candidate or EPDCCH candidate.

In a second aspect of the present disclosure, there is provided an eNode B (eNB) for wireless communication, comprising: a first transmitting unit configured to transmit a first downlink control information (DCI) to a user equipment (UE) in a first physical downlink control channel (PDCCH) candidate or enhanced PDCCH (EPDCCH) candidate; and a second transmitting unit configured to transmit a second DCI to the UE in a second PDCCH candidate or EPDCCH candidate, wherein the assignment of the second PDCCH candidate or EPDCCH candidate is determined based on the assignment of the first PDCCH candidate or EPDCCH candidate according to a predefined algorithm configured through radio resource control (RRC) signaling or fixed by specification.

In a second aspect of the present disclosure, there is provided a user equipment (UE) for wireless communication, comprising: a first detecting unit configured to detect a first downlink control information (DCI) transmitted from an eNode B (eNB) in a first physical downlink control channel (PDCCH) candidate or enhanced PDCCH (EPDCCH) candidate; a determining unit configured to determine the assignment of a second PDCCH candidate or EPDCCH candidate used by the eNB to transmit a second DCI based on the assignment of the first PDCCH candidate or EPDCCH candidate according to a predefined algorithm configured through radio resource control (RRC) signaling or fixed by specification; and a second detecting unit configured to detect the second DCI transmitted from the eNB in the second PDCCH candidate or EPDCCH candidate.

The foregoing is a summary and thus contains, by necessity, simplifications, generalization, and omissions of details. Other aspects, features, and advantages of the devices and/or processes and/or other subject matters described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

First Embodiment

In the present disclosure, in order to reduce the BD trials when more than one DCI are transmitted in wireless communication, it proposed to use the dependency between the (E)PDCCH (referring to PDCCH or EPDCCH) of a first DCI and the (E)PDCCH of a second DCI to indicate the assignment of the (E)PDCCH candidate used for the second DCI.

Figure 1:
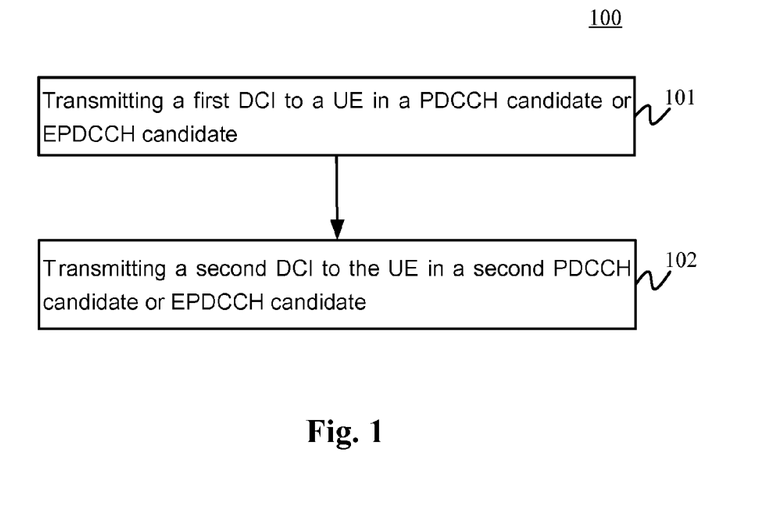
FIG. 1 illustrates a wireless communication method at eNB side according to a first embodiment of the present disclosure.

According to the first embodiment of the present disclosure, there is provided a wireless communication method 100 performed by an eNB as shown in FIG. 1. The wireless communication method 100 comprises a step 101 of transmitting a first DCI to a UE in a first PDCCH candidate or EPDCCH candidate. Here, the first DCI could be a traditional DCI defined in LTE Rel. 8-11 or any other DCI such as the DCI for interference indication. The method 100 also comprises a step 102 of transmitting a second DCI to the UE in a second PDCCH candidate or EPDCCH candidate (also simply referred to as (E)PDCCH candidate). Preferably, the second DCI can be a DCI for interference indication, but it can also be any other DCI such as a traditional DCI defined in LTE Rel. 8-11 or a DCI defined in the further. The type of the first or second DCI is not limited in the present disclosure. According to the first embodiment, the assignment of the second PDCCH candidate or EPDCCH candidate is determined based on the assignment of the first PDCCH candidate or EPDCCH candidate according to a predefined algorithm configured through RRC signaling or fixed by specification. In other words, the second (E)PDCCH for the second DCI is chosen depending on the first (E)PDCCH candidate for the first DCI according to a assignment rule (algorithm) known to both the eNB and UE. The algorithm can be fixed by specification or configured through RRC in order that the eNB and the UE both know it. Under this circumstance, the UE can get information on the second (E)PDCCH after having detected the first DCI; therefore, the UE may not need to blind detect the second DCI, or at least the BD trials will be reduced since some or all information (e.g. the aggregation level) on the second (E)PDCCH has been known based on the predefined algorithm and the detected first DCI.

In the first embodiment, the predefined algorithm used to determine the assignment of the second (E)PDCCH can be any suitable assignment rule, which is not limited in the first embodiment. For example, the aggregation level (AL) for the second DCI can be determined based on the aggregation level for the first DCI for example such that the receiving power per bit for the first (E)PDCCH candidate and the second (E)PDCCH is the same or there is an AL offset between the AL of the first (E)PDCCH candidate and the AL of the second (E)PDCCH, or a group of (E)PDCCH candidate(s) suitable for transmitting the second DCI can be determined based on a predetermined relationship between the desired receiving power per bit of the first DCI and the second DCI. As another example for the algorithm, the allocation position (i.e. the offset from the start candidate in its AL) of the second PDCCH candidate or EPDCCH candidate in its AL can be determined based on the allocation position of the first PDCCH candidate or EPDCCH candidate in its AL for example such that there is a predefined or indicated difference between the allocation position of the second (E)PDCCH candidate and the first (E)PDCCH. In the following second and third embodiment, specific algorithms will be described in detail.

In addition, part or all parameters used in the predefined algorithm for determining the assignment of the second (E)PDCCH candidate can be implicitly indicated by the allocation position of the first (E)PDCCH candidate, a scrambling bit in the (E)PDCCH for the first DCI, and/or the DCI format of the first DCI, or explicitly indicated by RRC signaling. The parameter here can be AL offset as described above, the allocation position difference as described above, DCI format, or any other parameter suitable to be used for determining the assignment of the second (E)PDCCH candidate. As can be seen from the following third embodiment, the above parameter can also be a parameter to further randomize the assignment dependency of the second (E)PDCCH on the first (E)PDCCH.

The above parameter (e.g., AL offset or allocation position difference) can be indicated implicitly by the allocation position of the first (E)PDCCH candidate (i.e. the offset of the (E)PDCCH candidate from the start candidate in its AL). For example, the even or odd number of the offset can be used to indicate different value of the AL offset or the allocation position difference.

Alternatively or in addition, the parameter (e.g., AL offset or allocation position difference) can be indicated implicitly by a scrambling bit in the (E)PDCCH for the first DCI. For example, an additional 1-bit q (the scrambling bit) can be used for CRC (Cyclic Redundancy Check) scrambling as in equation (1) below:

$$c_k = (b_k + x_{rnti,k-A} + x_{AS,k-A} + [bin(q,15),0]_k) \bmod 2 \text{ for } k=A, A+1, A+2, \ldots, A+15 \quad (1)$$

where bin(q,15) means transition of 1-bit width q to binary number with the width of 15 bits, A is the payload size, and $c_k$, $b_k$, $x_{rnti,k-A}$, $x_{AS,k-A}$ (UE transmit antenna selection mask) carry the meaning defined in 3GPP TS 36.212: "Evolved Universal Terrestrial Radio Access (E-UTRA); Multiplexing and channel coding" which is incorporated herein by reference. In this case, the scrambling bit q (0 or 1) can be used to indicate different value of the AL offset or the allocation position difference.

Alternatively or in addition, the above parameter (e.g., AL offset or allocation position difference) can be indicated implicitly by the DCI format of the first DCI. For example, if the first DCI is a traditional DCI, there're 2 DCI formats monitored in USS for each TM configured by RRC signaling. Thus, the above parameter can be indicated implicitly according to different DCI formats of the traditional DCI. For example, DCI format 1A and 2 shall be monitored for TM 4; if DCI format 1A is decoded, then the above parameter can be a value represented by "0", otherwise if DCI format 2 is decoded, the above parameter can be a value represented by "1".

Alternatively, the above parameter (e.g., AL offset or allocation position difference) can also be explicitly indicated by RRC signaling.

Figure 2:
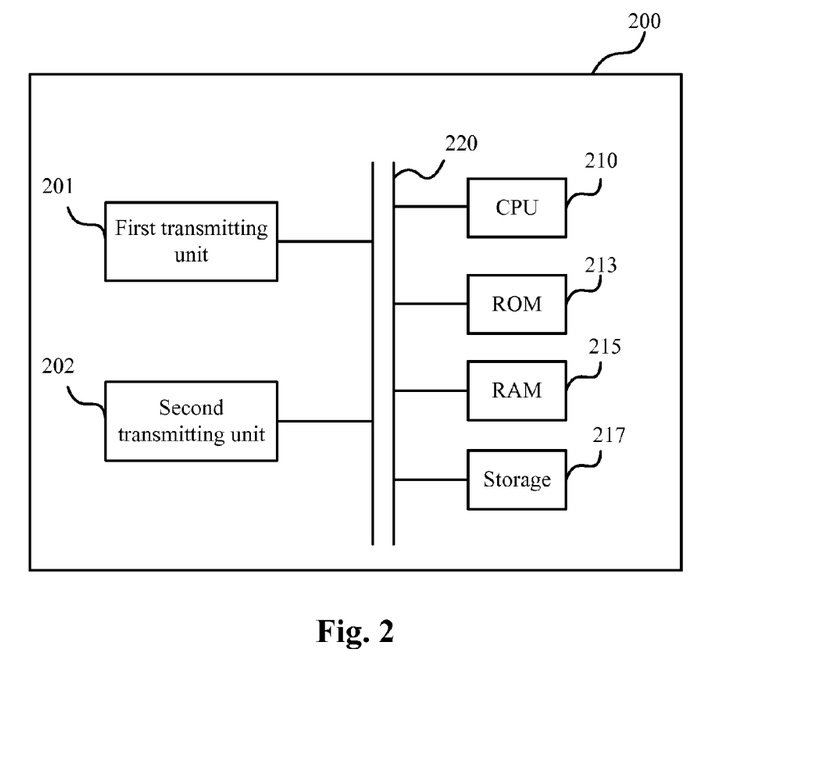
FIG. 2 is a block diagram illustrating an eNB according to the first embodiment of the present disclosure.

In the first embodiment, an eNB for performing the above method is also provided. FIG. 2 is a block diagram illustrating an eNB 200 according to the first embodiment of the present disclosure. The eNB 200 comprises a first transmitting unit 201 configured to transmit a first downlink control information (DCI) to a user equipment (UE) in a first physical downlink control channel (PDCCH) candidate or enhanced PDCCH (EPDCCH) candidate and a second transmitting unit 202 configured to transmit a second DCI to the UE in a second PDCCH candidate or EPDCCH candidate, wherein the assignment of the second PDCCH candidate or EPDCCH candidate is determined based on the assignment of the first PDCCH candidate or EPDCCH candidate according to a predefined algorithm configured through radio resource control (RRC) signaling or fixed by specification.

The eNB 200 according to the present disclosure may optionally include a CPU (Central Processing Unit) 210 for executing related programs to process various data and control operations of respective units in the eNB 200, a ROM (Read Only Memory) 213 for storing various programs required for performing various process and control by the CPU 210, a RAM (Random Access Memory) 215 for storing intermediate data temporarily produced in the procedure of process and control by the CPU 210, and/or a storage unit 217 for storing various programs, data and so on. The above first transmitting unit 201, the second transmitting unit 202, CPU 210, ROM 213, RAM 215 and/or storage unit 217 etc. may be interconnected via data and/or command bus 220 and transfer signals between one another.

Respective units as described above do not limit the scope of the present disclosure. According to one implementation of the disclosure, the functions of the above first transmitting unit 201 and second transmitting unit 202 may be implemented by hardware, and the above CPU 210, ROM 213, RAM 215 and/or storage unit 217 may not be necessary. Alternatively, the functions of the above first transmitting unit 201 and second transmitting unit 202 may also be implemented by functional software in combination with the above CPU 210, ROM 213, RAM 215 and/or storage unit 217 etc.

Figure 3:
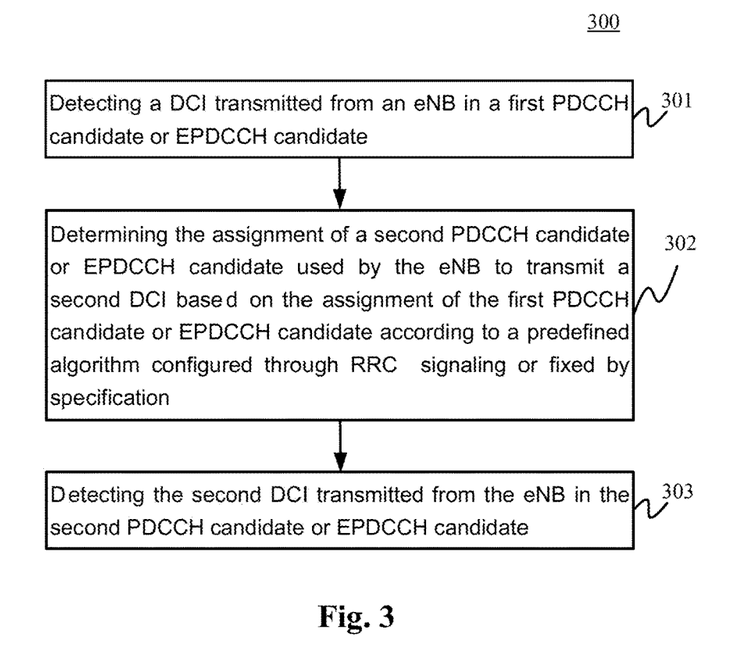
FIG. 3 illustrates a wireless communication method at UE side according to the first embodiment of the present disclosure.

Accordingly, at UE side, the first embodiment can be implemented as wireless communication method 300 as shown in FIG. 3. In particular, the method 300 comprising a step 301 of detecting a first downlink control information (DCI) transmitted from an eNode B (eNB) in a first physical downlink control channel (PDCCH) candidate or enhanced PDCCH (EPDCCH) candidate, a step 302 of determining the assignment of a second PDCCH candidate or EPDCCH candidate used by the eNB to transmit a second DCI based on the assignment of the first PDCCH candidate or EPDCCH candidate according to a predefined algorithm configured through radio resource control (RRC) signaling or fixed by specification, and a step 303 of detecting the second DCI transmitted from the eNB in the second PDCCH candidate or EPDCCH candidate. At the UE side, after having detected the first DCI, the UE can determine the information on the assignment (e.g. the AL and or the allocation position) of the second (E)PDCCH based on the information on the first (E)PDCCH candidate of the first DCI together with the predefined algorithm, and then the UE can detect the second DCI with the aid of the determined information so that BD trials can be avoided or at least reduced.

Figure 4:
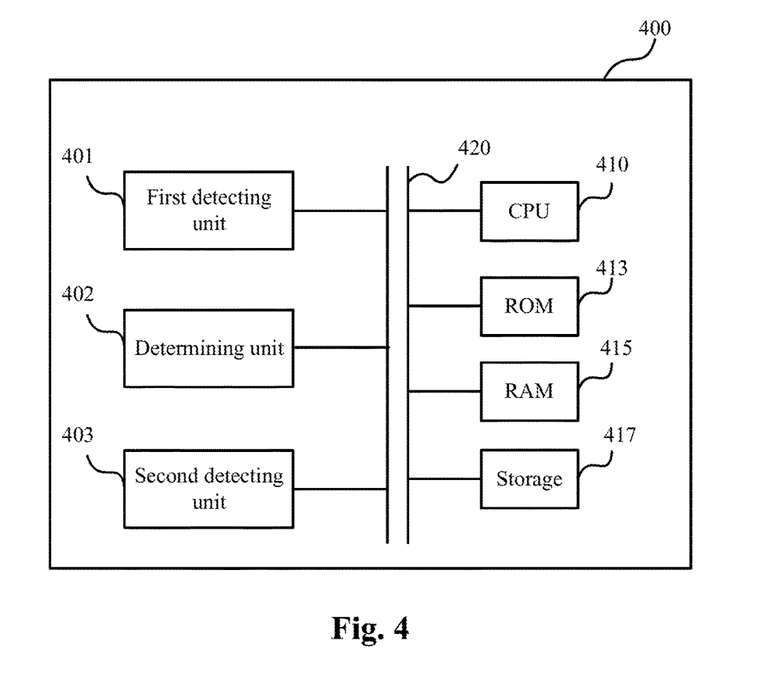
FIG. 4 is a block diagram illustrating a UE according to the first embodiment of the present disclosure.

In addition, in the first embodiment, a UE for performing the above method is also provided. FIG. 4 is a block diagram illustrating a UE 400 according to the first embodiment of the present disclosure. The UE 400 comprises: a first detecting unit 401 configured to detect a first downlink control information (DCI) transmitted from an eNode B (eNB) in a first physical downlink control channel (PDCCH) candidate or enhanced PDCCH (EPDCCH) candidate; a determining unit 402 configured to determine the assignment of a second PDCCH candidate or EPDCCH candidate used by the eNB to transmit a second DCI based on the assignment of the first PDCCH candidate or EPDCCH candidate according to a predefined algorithm configured through radio resource control (RRC) signaling or fixed by specification; and a second detecting unit 403 configured to detect the second DCI transmitted from the eNB in the second PDCCH candidate or EPDCCH candidate.

The UE 400 according to the present disclosure may optionally include a CPU (Central Processing Unit) 410 for executing related programs to process various data and control operations of respective units in the UE 400, a ROM (Read Only Memory) 413 for storing various programs required for performing various process and control by the CPU 410, a RAM (Random Access Memory) 415 for storing intermediate data temporarily produced in the procedure of process and control by the CPU 410, and/or a storage unit 417 for storing various programs, data and so on. The above first detecting unit 401, determining unit 402, second detecting unit 403, CPU 410, ROM 413, RAM 415 and/or storage unit 417 etc. may be interconnected via data and/or command bus 420 and transfer signals between one another.

Respective units as described above do not limit the scope of the present disclosure. According to one implementation of the disclosure, the functions of the above first detecting unit 401, determining unit 402 and second detecting unit 403 may be implemented by hardware, and the above CPU 410, ROM 413, RAM 415 and/or storage unit 417 may not be necessary. Alternatively, the functions of the above first detecting unit 401, determining unit 402 and second detecting unit 403 may also be implemented by functional software in combination with the above CPU 410, ROM 413, RAM 415 and/or storage unit 417 etc.

Second Embodiment

The second embodiment is a preferable implementation of the first embodiment, and the description to the first embodiment also applies to the second embodiment unless the context indicates otherwise.

In the second embodiment, a group of PDCCH candidate(s) or EPDCCH candidate(s) suitable for transmitting the second DCI can be determined based on a predetermined relationship between the desired receiving power per bit of the first DCI and the second DCI according to the predefined algorithm configured through RRC signaling or fixed by specification.

In particular, the predefined algorithm comprises:

$$N_{(E)CCE}^{SecondDCI} = f\left(\frac{P_{candidate}^{FirstDCI} \times N_{(E)CCE}^{FirstDCI} \times N_{bit}^{SecondDCI}}{\alpha \times P_{candidate}^{SecondDCI} \times N_{bit}^{FirstDCI}}\right), \quad (2)$$

where $N_{(E)CCE}^{FirstDCI}$ is the aggregation level (AL) for the first DCI, $N_{(E)CCE}^{SecondDCI}$ is the AL for the first DCI, $N_{bit}^{FirstDCI}$ is the number of bits for the first DCI, $N_{bit}^{SecondDCI}$ is the number of bits for the second DCI, $P_{candidate}^{FirstDCI}$ represents the averaged channel condition of the first PDCCH candidate or EPDCCH candidate, $P_{candidate}^{SecondDCI}$ represents the averaged channel condition of the second PDCCH candidate or EPDCCH candidate, $\alpha$ represents a predetermined ratio between the desired receiving power per bit for the first DCI and the desired receiving power per bit for the second DCI (which is an example of predetermined relationship between the desired receiving power per bit of the first DCI and the second DCI), and $f$ function represents an approximation function for approximating the argument of the function to be one of the possible ALs for the second DCI as the result of the function.

In the second embodiment, it is assumed that the desired receiving power per bit at UE side for the first DCI and the second DCI needs to have a ratio $\alpha$. If the first DCI needs same reliable transmission as the second DCI, then the ratio $\alpha$ will be 1. If the first DCI needs more reliable transmission than the second DCI, then the ratio $\alpha$ will be larger than 1.

In addition, it is also assumed that the first (E)PDCCH candidate and the second (E)PDCCH experience averaged channel conditions and $P_{candidate}^{FirstDCI}$ and $P_{candidate}^{SecondDCI}$. The averaged channel conditions $P_{candidate}^{FirstDCI}$ and $P_{candidate}^{SecondDCI}$ represent the averaged signal degradation over the respective (E)PDCCH candidates, and the larger the $P_{candidate}^{FirstDCI}$ and $P_{candidate}^{SecondDCI}$, the smaller the signal degradation. As an example, the $P_{candidate}^{FirstDCI}$ or $P_{candidate}^{SecondDCI}$ can be expressed as the total receiving power of the (E)PDCCH candidate divided by the number of (E)CCEs in the (E)PDCCH candidate. Regarding the calculation of $P_{candidate}^{FirstDCI}$ or $P_{candidate}^{SecondDCI}$, both eNB and UE should use the same $P_{candidate}^{FirstDCI}$ or $P_{candidate}^{SecondDCI}$ value for unambiguous calculation by CSI (Channel State Information) feedback from UE or in TDD (Time Division Duplexing) by utilizing channel reciprocity between DL (PDSCH/PDCCH) and UL (SRS/PUSCH/PUCCH). For example, the $P_{candidate}^{FirstDCI}$ or $P_{candidate}^{SecondDCI}$ can be obtained through CSI feedback using channel quality indicator (CQI). UE detects the receiving power of CRS in the whole system bandwidth, and accordingly UE can report the CQI of each subband in the whole system bandwidth. Both UE and eNB can obtain the SNR of corresponding CQI (MCS) by checking the workable SNR (i.e., the SNR value when current MCS's BLER=10%) of each MCS, and the SNR value can be seen as equivalent power of this subband. For a certain (E)PDCCH candidate, total power of this (E)PDCCH candidate can be calculated by summarizing the power of its (E)CCEs. The averaged power per (E)CCE (which can be regarded as $P_{candidate}^{FirstDCI}$ or $P_{candidate}^{SecondDCI}$) equals to the total power of the (E)PDCCH candidate divided by the number of (E)CCEs (i.e., AL) of the (E)PDCCH candidate. As a result, both the UE and eNB can obtain the same value of $P_{candidate}^{FirstDCI}$ or $P_{candidate}^{SecondDCI}$. However, it is noted that $P_{candidate}^{FirstDCI}$ and $P_{candidate}^{SecondDCI}$ can be any other absolute or relative values representing the channel conditions.

In the equation (2), an $f$ function is used to make the calculated AL (i.e. the number of the (E)CCEs in one (E)PDCCH candidate) be one of the possible ALs for the second DCI, for example, to approximate the calculated AL toward the value belonging to {1, 2, 4, 8} for PDCCH and {1, 2, 4, 8, 16, 32} for EPDCCH. Three ways of approximation can be used, which are approximating a value to the nearest possible AL (round), approximating the value to the nearest possible AL that is smaller than the value (round-down), and approximating the value to the nearest possible AL that is larger than the value (roundup). The approximation ways can be configured by RRC signaling or fixed by specification.

Figure 5:
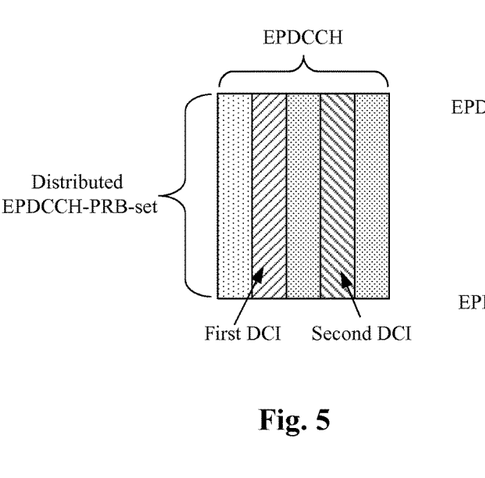
FIG. 5 schematically illustrates the first EPDCCH and the second EPDCCH in one distributed EPDCCH-PRB-set according to a second embodiment of the present disclosure.

As a first example of the second embodiment, it is assumed that the averaged channel condition for the first (E)PDCCH candidate and the second (E)PDCCH candidate is the same, i.e., $P_{candidate}^{FirstDCI} = P_{candidate}^{SecondDCI}$. For example, if the first DCI and the second DCI are both in PDCCH or in one same EPDCCH-PRB-set with distributed mapping, the above assumption can be satisfied. FIG. 5 schematically illustrates the first EPDCCH and the second EPDCCH in one distributed EPDCCH-PRB-set according to a second embodiment of the present disclosure. In this case, the AL $N_{(E)CCE}^{SecondDCI}$ for the second DCI can be directly determined by equation (2). In other words, the (E)PDCCH candidates in the determined AL compose the above group of (E)PDCCH candidates suitable for transmitting the second DCI. Two calculation examples are given in the following.

1) The first DCI and the second DCI are transmitted in PDCCH.
   If $N_{(E)CCE}^{FirstDCI}=8$, $N_{bit}^{FirstDCI}=40$, $\alpha=2$, $N_{bit}^{SecondDCI}=52$,
   then $N_{bit}^{SecondDCI}=f(5.2)=4(\text{round})/4(\text{rounddown})/8(\text{roundup})$.
   In this specific example, all the (E)PDCCH candidates in the AL 4 (round or rounddown) or AL 8 (roundup) compose the group of (E)PDCCH candidates suitable for transmitting the second DCI.

2) The first DCI and the second DCI are transmitted in EPDCCH. Suppose 8-RB is assigned to one distributed EPDCCH-PRB-set for Case 1 (defined in 3GPP TS 36.213 which is incorporated herein by reference), the number of EPDCCH candidate at each AL can be found in Table 9.1.4-1a in 3GPP TS 36.213.
   If $N_{(E)CCE}^{FirstDCI}=8$, $N_{bit}^{FirstDCI}=40$, $\alpha=1$, $N_{bit}^{SecondDCI}=57$,
   then $N_{(E)CCE}^{SecondDCI}=f(11.2)=8(\text{round})/8(\text{rounddown})/16(\text{roundup})$.
   In this specific example, all the (E)PDCCH candidates in the AL 8 (round or rounddown) or AL 16 (roundup) compose the group of (E)PDCCH candidates suitable for transmitting the second DCI.

According to the first example of the second embodiment, it is possible to reduce the number of AL for BD to only 1 if both (E)PDCCH assignment in eNB and (E)PDCCH BD in UE use the same calculation of AL dependency, thus the BD trials for the second DCI would be reduced greatly.

Figure 6:
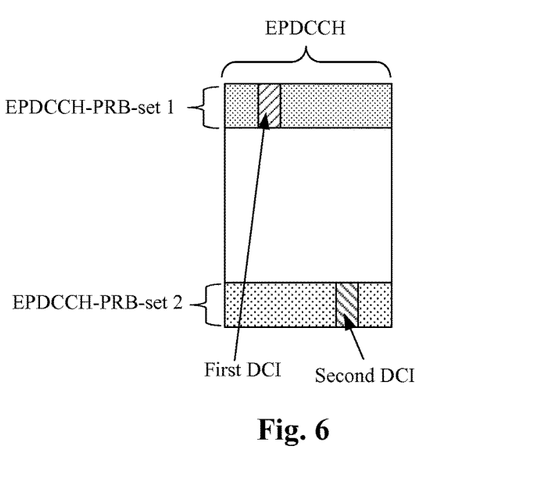
FIG. 6 schematically illustrates the first EPDCCH and the second EPDCCH in two different EPDCCH-PRB-sets according to the second embodiment of the present disclosure.

As a second example of the second embodiment, it is assumed that the first DCI and the second DCI are transmitted in different time-frequency resources, that is, the first (E)PDCCH candidate and the second (E)PDCCH candidate experience different channel conditions (i.e. $P_{candidate}^{FirstDCI} \neq P_{candidate}^{SecondDCI}$), and different (E)CCEs may also experience different channel conditions. For example, the first DCI and the second DCI are transmitted respectively in PDCCH and EPDCCH, or in EPDCCHs of different EPDCCH-PRB-sets as shown in FIG. 6, or different PRBs of one EPDCCH-PRB-set, or (E)PDCCHs in different subframes, or (E)PDCCHs in different component carriers in carrier aggregation, or the like.

In the second example, different (E)CCEs may have different channel conditions; therefore, the calculation of AL for the second DCI should be taken in all (E)PDCCH candidates in the CSS and USS according to equation (2). For each (E)PDCCH candidate in the CSS and USS, if the calculated AL of the (E)PDCCH candidate according to equation (2) matches the AL of the input (E)PDCCH candidate, the input (E)PDCCH candidate will be considered as a suitable (E)PDCCH candidate for the second (E)PDCCH candidate, i.e. belong to the above-mentioned group of (E)PDCCH candidates suitable for transmitting the second DCI. If the calculated AL of the (E)PDCCH candidate according to equation (2) does not match the AL of the input (E)PDCCH candidate, the input (E)PDCCH candidate would not be considered as a suitable (E)PDCCH candidate for the second (E)PDCCH candidate, and at UE side, this input (E)PDCCH candidate shall be ignored for BD. For example, assume $N_{(E)CCE}^{FirstDCI}=8$, $N_{bit}^{FirstDCI}=40$, $\alpha=2$, $N_{bit}^{SecondDCI}=52$, $P_{candidate}^{FirstDCI}=1$ (relative value), and for a certain (E)PDCCH candidate, $P_{candidate}^{SecondDCI}=0.8$ (relative value), then the calculated AL of said certain (E)PDCCH candidate would be $N_{(E)CCE}^{SecondDCI}=f(6.5)=8(\text{round})/4(\text{rounddown})/8(\text{roundup})$. Then, whether the actual AL of said certain (E)PDCCH is equal to the calculated AL is determined. If they are equal, said certain (E)PDCCH would be considered as a suitable second (E)PDCCH candidate for the second DCI. Otherwise, said certain (E)PDCCH would not be considered as a suitable second (E)PDCCH candidate for the second DCI and will be ignored for BD at UE side.

For the second example, a more efficient method is proposed to determine the suitable (E)PDCCH candidates for the second DCI, i.e. the above-mentioned group. In this method, a range $P_{candidate}^{SecondDCI}$ for each AL is calculated, and then for each (E)PDCCH candidate in a certain AL, whether the $P_{candidate}^{SecondDCI}$ of the (E)PDCCH candidate is in the range of $P_{candidate}^{SecondDCI}$ in current AL is determined. If the $P_{candidate}^{SecondDCI}$ of the (E)PDCCH candidate is in the range, the (E)PDCCH would be considered as a suitable second (E)PDCCH candidate for the second DCI. Otherwise, the (E)PDCCH would not be considered as a suitable second (E)PDCCH candidate for the second DCI and will be ignored for BD at UE side.

For example, assume $N_{(E)CCE}^{FirstDCI}=8$, $N_{bit}^{FirstDCI}=40$, $\alpha=2$, $N_{bit}^{SecondDCI}=52$, and $P_{candidate}^{FirstDCI}=1$ (relative value), then the range of $P_{candidate}^{SecondDCI}$ for each AL (PDCCH is assumed) is calculated according to equation (2) as follows:

AL=8:

$$8 = f\left(\frac{5.2}{P_{candidate}^{SecondDCI}}\right),$$

For round: $P_{candidate}^{SecondDCI} \leq 0.87$
For rounddown: $P_{candidate}^{SecondDCI} \leq 0.65$
For roundup: $P_{candidate}^{SecondDCI} < 1.3$;

AL=4:

$$4 = f\left(\frac{5.2}{P_{candidate}^{SecondDCI}}\right),$$

For round: $0.87 < P_{candidate}^{SecondDCI} \leq 1.73$
For rounddown: $0.65 < P_{candidate}^{SecondDCI} \leq 1.3$
For roundup: $1.3 \leq P_{candidate}^{SecondDCI} < 2.6$;

AL=2:

$$2 = f\left(\frac{5.2}{P_{candidate}^{SecondDCI}}\right),$$

For round: $1.73 < P_{candidate}^{SecondDCI} \leq 3.47$
For rounddown: $1.3 < P_{candidate}^{SecondDCI} \leq 2.6$
For roundup: $2.6 \leq P_{candidate}^{SecondDCI} < 5.2$;

AL=1:

$$1 = f\left(\frac{5.2}{P_{candidate}^{SecondDCI}}\right),$$

For round: $3.47 < P_{candidate}^{SecondDCI}$
For rounddown: $2.6 < P_{candidate}^{SecondDCI}$
For roundup: $5.2 \leq P_{candidate}^{SecondDCI}$.

After the range of $P_{candidate}^{SecondDCI}$ for each AL is calculated, the $P_{candidate}^{SecondDCI}$ of a (E)PDCCH candidate in an AL is compared with the range for the AL. For example, if the $P_{candidate}^{SecondDCI}$ of a (E)PDCCH candidate in AL-8 is 0.8, then the (E)PDCCH candidate is a possible candidate for the second DCI if the round or roundup approximation is used, and it is not a suitable candidate for the second DCI if the rounddown approximation is used. After repeating the above process for all the (E)PDCCH candidates, the above-mentioned group of (E)PDCCH candidates suitable for transmitting the second DCI. At UE side, after determining the above-mentioned group, the BD trials for the second DCI can only be performed in the determined group.

In addition, as a modification to the second embodiment, if all the PDCCH candidate(s) or EPDCCH candidate(s) in the determined group would result in blocking, then a different PDCCH candidate or EPDCCH candidate outside the determined group is used for the second DCI. In other words, the above described assignment dependency is not mandatory but as a first option. Accordingly, at UE side, after determining the group of PDCCH candidate(s) or EPDCCH candidate(s) suitable for transmitting the second DCI, the UE first detects the second DCI in the determined group, and if the second DCI is not successfully detected in the determined group, then blind-detects PDCCH candidate(s) or EPDCCH candidate(s) outside the determined group. In this way, the second DCI may be detected earlier than a traditional BD without increasing the blocking ratio.

In addition, as an enhancement to the second embodiment, if the total number of PDCCH candidates or EPDCCH candidates in the determined group in UE-specific search space (USS) or common search space (CSS) is smaller than the number of all DCIS determined to be transmitted in the determined group, then an PDCCH candidate or EPDCCH candidate outside the USS or CSS is extended. For example, if there are 3 second DCIS needed to be transmitted, and 2 suitable (E)PDCCH candidates in the USS or CSS are determined according to equation (2), then a (E)PDCCH candidate outside the USS or CSS will be extended to transmit the second DCI. The positions of extended (E)PDCCH candidates can be calculated according to a predefined algorithm fixed in specification or implicitly indicated by the first (E)PDCCH candidate or configured through RRC signaling. For example, the extended (E)PDCCH candidate can be located at a predetermined or indicated distance to the first (E)PDCCH candidate, wherein the distance can for example be calculated through equations similar to the equations used in the following third embodiment by taking the $Y_{SecondDCI}^{(L)}$ as the distance. Preferably, when extending the (E)PDCCH candidate outside the USS or CSS, equation (2) is also applied. In other words, the extended (E)PDCCH candidate(s) that is/are to be used for the second DCI should also satisfy equation (2). In this way, the required receiving power for second DCI can be satisfied. Accordingly, at UE side, after determining the group of PDCCH candidate(s) or EPDCCH candidate(s) suitable for transmitting the second DCI, if the total number of PDCCH candidates or EPDCCH candidates in the determined group within UE-specific search space (USS) or common search space (CSS) is smaller than the number of all DCIS determined to be transmitted in the determined group, then the UE detects the second DCI in a range including a PDCCH candidate or EPDCCH candidate outside the USS or CSS in addition to PDCCH candidates or EPDCCH candidates within the USS or CSS.

Third Embodiment

The third embodiment is a preferable implementation of the first embodiment, and the description to the first embodiment also applies to the third embodiment unless the context indicates otherwise.

In the third embodiment, the allocation position of the second PDCCH candidate or EPDCCH candidate in its AL can be determined based on the allocation position of the first PDCCH candidate or EPDCCH candidate in its AL according to the predefined algorithm. Here, the allocation position means the serial number of the (E)PDCCH candidate in its AL, i.e. the offset from the start candidate in its AL. For example, the first allocation position (i.e., the start (E)PDCCH candidate) in an AL can be denoted as position "0", the second allocation position (i.e., the (E)PDCCH candidate next to the start one) can be denoted as position "1", and so on.

Preferably, the allocation position of the second PDCCH candidate or EPDCCH candidate within its AL can be determined by:

$$Y_{SecondDCI}^{(L)} = \mod(Y_{FirstDCI}^{(L)} + 1) \quad (3)$$

if the first DCI and the second DCI are in the same AL,
where $i_p = i_{p-1} + \mod(Y_k, M^{(L)} - p) + 1$, $i_0 = 0$, $p \in [1, M^{(L)} - 1]$, $i_p \in [1, M^{(L)} - 1]$, $Y^{(L)} \in [0, M^{(L)} - 1]$, $Y_{FirstDCI}^{(L)}$ is the allocation position of the first PDCCH candidate or EPDCCH candidate in AL-L, $Y_{SecondDCI}^{(L)}$ is the allocation position of the second PDCCH candidate or EPDCCH candidate in AL-L, $M^{(L)}$ is the number of PDCCH candidates or EPDCCH candidates in AL-L, p represents the serial number of the second DCI among the DCIs to be transmitted together with the first DCI, and $Y_k$ is defined in 3GPP TS 36.213 (which is incorporated herein by reference); and $$Y_{SecondDCI}^{(L)} = \mod(Y_{FirstDCI}^{(L1)} + i_p, M^{(L2)}) + 1 \quad (4)$$

if the first DCI and the second DCI are in different ALs, where $i_p = i_{p-1} + \mod(Y_k, M^{(L2)} - p)$, $i_0 = 0$, $p \in [1, M^{(L2)}]$, $i_p \in [0, M^{(L2)} - 1]$, $Y^{(L_n)} \in [0, M^{(L_n)} - 1]$, $Y_{FirstDCI}^{(L1)}$ is the allocation position of the first PDCCH candidate or EPDCCH candidate in AL-$L_1$, $Y_{SecondDCI}^{(L2)}$ is the allocation position of the second PDCCH candidate or EPDCCH candidate in AL-$L_2$, $M^{(L_n)}$ is the number of PDCCH candidates or EPDCCH candidates in AL-$L_n$, p represents the serial number of the second DCI among the DCIs to be transmitted together with the first DCI, and $Y_k$ is defined in 3GPP TS 36.213: "Evolved Universal Terrestrial Radio Access (E-UTRA); Physical layer procedures" which is incorporated herein by reference.

In the above equation (3) or (4), a parameter p is introduced which represents the serial number of the second DCI among the DCIs to be transmitted together with the first DCI. When there are more than one second DCI needed to be transmitted together with the first DCI, those second DCIs need to be transmitted in different allocation positions to avoid blocking. Therefore, the parameter p is introduced to denote those second DCIs differently. The parameter p can be determined in such a manner that the second DCIs to be transmitted together with the first DCI are sorted in an arbitrary order, and a series of continuous serial numbers beginning from "1" (1, 2, 3, . . . ) are then assigned to the sorted DCIs. The assigned serial number to a certain DCI is the parameter p for said certain DCI.

Figure 7:
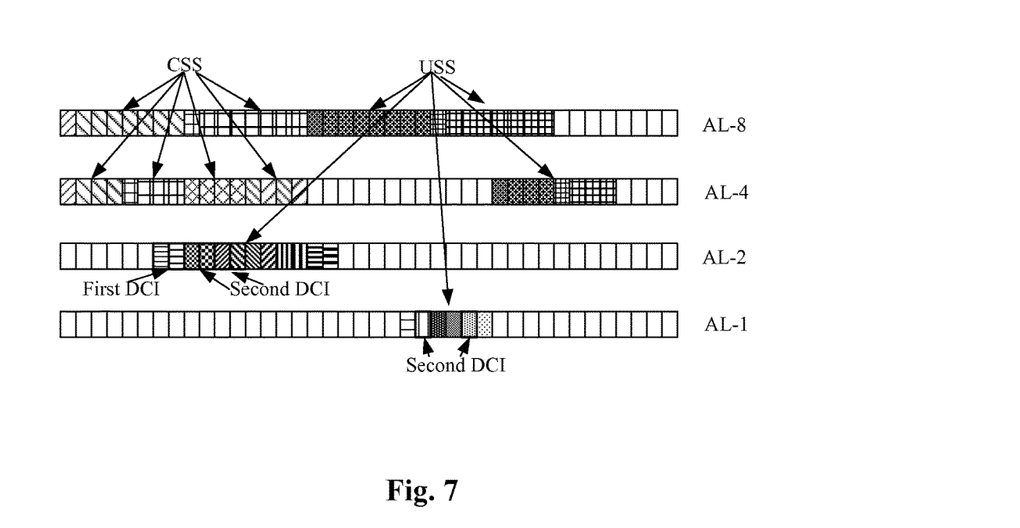
FIG. 7 schematically illustrates the allocation position dependency of the second DCI on the first DCI according to a third embodiment of the present disclosure.

FIG. 7 schematically illustrates the allocation position dependency of the second DCI on the first DCI according to a third embodiment of the present disclosure. In the example of FIG. 7, the first DCI and the second DCI are transmitted in PDCCH, and the allocation position of the first DCI is "0" (the first position) in AL-2. As can be seen from FIG. 7, the allocation position for the second DCI can be determined as "1" or "2" in AL-2 (the same AL with the first DCI) or "1" or "4" in AL-1 (a different AL from the first DCI). However, it is noted that FIG. 7 is only an example, and is not intended to limit the present disclosure.

According to the third embodiment, only one (E)PDCCH candidate per AL can be obtained for each second DCI. If the third embodiment is combined with the first example of the second embodiment in which the AL for the second DCI is uniquely determined, the second (E)PDCCH candidate for the second DCI can be uniquely determined, and thus the BD trials can be reduced to 1 time decoding for each second DCI.

In order to further reduce blocking probability of (E)PDCCH, more parameter(s) can be introduced into equation (3) or (4) to further randomize the dependency of the allocation position of the second (E)PDCCH candidate on the first (E)PDCCH candidate. For example, 3 new offset parameters (i.e. $q_1$, $q_2$ and $q_3$, $q_n$=0 or 1, n=1, 2, 3) can be introduced into equation (3) (the same applies to equation (4)). After the modification, the equation (3) becomes equation (5) as:

$$Y_{SecondDCI}^{(L)} = \mod(Y_{FirstDCI}^{(L)} + i_p + 2^2 \times q_1 + 2^1 \times q_2 + 2^0 \times q_3, M^{(L)}) + 1 \quad (5).$$

According to equation (5), the dependency of the allocation position is further randomized by $q_1$, $q_2$ and $q_3$. As described in the first embodiment, the offset parameters can be implicitly indicated by the allocation position of the first PDCCH candidate or EPDCCH candidate, a scrambling bit in the PDCCH or EPDCCH for the first DCI, and/or the DCI format of the first DCI, or explicitly indicated by RRC signaling.

In addition, as a modification to the third embodiment, if the determined allocation position of the second PDCCH candidate or EPDCCH candidate in the above manner would result in blocking, then a different allocation position will be used as the allocation position of the second PDCCH candidate or EPDCCH candidate. In other words, the above described allocation dependency is not mandatory but as a first option. Accordingly, at UE side, after determining the allocation position of the second PDCCH candidate or EPDCCH candidate within its AL in the above manner, the UE first detect the second DCI in the determined allocation position, but if the second DCI is not successfully detected in the determined allocation position, then blind-detect other allocation positions. In this way, the second DCI may be detected earlier than a traditional BD without increasing the blocking ratio.

(Alternative)

As an alternative may to reduce BD trials for the second DCI, an indicator can be added in a first DCI (e.g., traditional DCI) to indicate the assignment of (E)PDCCH candidates for the second DCI. After decoding the first DCI, the (E)PDCCH candidate(s) for the second DCI can be found according to the indicator. It needs no BD but "scheduled decoding" for the second DCI, and thus the decoding complexity is greatly reduced. For example, a 4-bit indicator can be added in the first DCI to explicitly indicate one EPDCCH candidate in an EPDCCH-PRB-set shown in Table 9.1.4-3b of 3GPP TS 36.213.

The present invention can be realized by software, hardware, or software in cooperation with hardware. Each functional block used in the description of each embodiment described above can be realized by an LSI as an integrated circuit. They may be individually formed as chips, or one chip may be formed so as to include a part or all of the functional blocks. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used. Further, the calculation of each functional block can be performed by using calculating means, for example, including a DSP or a CPU, and the processing step of each function may be recorded on a recording medium as a program for execution. Furthermore, when a technology for implementing an integrated circuit that substitutes the LSI appears in accordance with the advancement of the semiconductor technology or other derivative technologies, it is apparent that the functional block may be integrated by using such technologies.

It is noted that the present invention intends to be variously changed or modified by those skilled in the art based on the description presented in the specification and known technologies without departing from the content and the scope of the present invention, and such changes and applications fall within the scope that claimed to be protected. Furthermore, in a range not departing from the content of the invention, the constituent elements of the above-described embodiments may be arbitrarily combined.

What is claimed is:

1. A wireless communication method performed by an eNode B (eNB), comprising steps of:
   transmitting a first downlink control information (DCI) to a user equipment (UE) in a first physical downlink control channel (PDCCH) candidate or enhanced PDCCH (EPDCCH) candidate; and
   transmitting a second DCI to the UE in a second PDCCH candidate or EPDCCH candidate,
   wherein an assignment of the second PDCCH candidate or EPDCCH candidate is determined based on an assignment of the first PDCCH candidate or EPDCCH candidate according to a defined algorithm, wherein the defined algorithm is based on an assignment dependency between the first PDCCH candidate or EPDCCH candidate and the second PDCCH candidate or EPDCCH candidate, and is configured through radio resource control (RRC) signaling or fixed by specification,
   wherein an aggregation level (AL) for a group of PDCCH candidate(s) or EPDCCH candidate(s) suitable for transmitting the second DCI is based on an approximation function to approximate one of the possible ALs for the second DCI based on a determined relationship between a desired receiving power per bit of the first DCI and the second DCI according to the defined algorithm.

2. The wireless communication method according to claim 1, wherein
the second DCI is used to indicate interference to the UE.

3. The wireless communication method according to claim 1, wherein the defined algorithm comprises:

$$N_{(E)CCE}^{SecondDCI} = f\left(\frac{P_{candidate}^{FirstDCI} \times N_{(E)CCE}^{FirstDCI} \times N_{bit}^{SecondDCI}}{\alpha \times P_{candidate}^{SecondDCI} \times N_{bit}^{FirstDCI}}\right),$$

where $N_{(E)CCE}^{FirstDCI}$ is an aggregation level (AL) for the first DCI, $N_{(E)CCE}^{SecondDCI}$ is the AL for the second DCI, $N_{bit}^{FirstDCI}$ is the number of bits for the first DCI, $N_{bit}^{SecondDCI}$ is the number of bits for the second DCI, $P_{candidate}^{FirstDCI}$ represents the averaged channel condition of the first PDCCH candidate or EPDCCH candidate, $P_{candidate}^{SecondDCI}$ represents the averaged channel condition of the second PDCCH candidate or EPDCCH candidate, $\alpha$ represents a determined ratio between the desired receiving power per bit for the first DCI and the desired receiving power per bit for the second DCI, and $f$ function represents the approximation function, which approximates an argument of the function to be one of the possible ALs for the second DCI as the result of the $f$ function.

4. The wireless communication method according to claim 1, wherein
when all the PDCCH candidate(s) or EPDCCH candidate(s) in the determined group result in blocking, then a different PDCCH candidate or EPDCCH candidate outside the determined group is used for the second DCI.

5. The wireless communication method according to claim 1, wherein
when the total number of PDCCH candidates or EPDCCH candidates in the determined group in UE-specific search space (USS) or common search space (CSS) is smaller than the number of all DCIs determined to be transmitted in the determined group, then an PDCCH candidate or EPDCCH candidate outside the USS or CSS is extended.

6. A wireless communication method performed by an eNode B (eNB), comprising steps of:
transmitting a first downlink control information (DCI) to a user equipment (UE) in a first physical downlink control channel (PDCCH) candidate or enhanced PDCCH (EPDCCH) candidate; and
transmitting a second DCI to the UE in a second PDCCH candidate or EPDCCH candidate,
wherein an assignment of the second PDCCH candidate or EPDCCH candidate is determined based on an assignment of the first PDCCH candidate or EPDCCH candidate according to a defined algorithm, wherein the defined algorithm is based on an assignment dependency between the first PDCCH candidate or EPDCCH candidate and the second PDCCH candidate or EPDCCH candidate, and is configured through radio resource control (RRC) signaling or fixed by specification,
wherein an allocation position of the second PDCCH candidate or EPDCCH candidate in its aggregation level (AL) is determined based on an allocation position of the first PDCCH candidate or EPDCCH candidate in its AL according to the defined algorithm, and
wherein the defined algorithm includes:
a first modulo arithmetic based on the allocation position of the first PDCCH candidate or EPDCCH candidate when the first DCI and the second DCI are in the same AL; and
a second modulo arithmetic different from the first modulo arithmetic, the second modulo arithmetic being based on the allocation position of the first PDCCH candidate or EPDCCH candidate when the first DCI and the second DCI are in different ALs.

7. The wireless communication method according to claim 6, wherein the allocation position of the second PDCCH candidate or EPDCCH candidate within its AL is determined by:
$Y_{SecondDCI}^{(L)} = \mod(Y_{FirstDCI}^{(L)} + i_p, M^{(L)}) + 1$ when the first DCI and the second DCI are in the same AL,
where $i_p = i_{p-1} + \mod(Y_k, M^{(L)} - p) + 1$, $i_0 = 0$, $p \in [1, M^{(L)} - 1]$, $i_p \in [1, M^{(L)} - 1]$, $Y^{(L)} \in [0, M^{(L)} - 1]$, $Y_{FirstDCI}^{(L)}$ is the allocation position of the first PDCCH candidate or EPDCCH candidate in AL-L, $Y_{SecondDCI}^{(L)}$ is the allocation position of the second PDCCH candidate or EPDCCH candidate in AL-L, $M^{(L)}$ is the number of PDCCH candidates or EPDCCH candidates in AL-L, p represents a serial number of the second DCI among the DCIs to be transmitted together with the first DCI, and $Y_k$ is defined in 3GPP TS 36.213; and
$Y_{SecondDCI}^{(L_2)} = \mod(Y_{FirstDCI}^{(L_1)} + i_p, M^{(L_2)}) + 1$ when the first DCI and the second DCI are in different ALs,
where $i_p = i_{p-1} + \mod(Y_k, M^{(L_2)} - p)$, $i_0 = 0$, $p \in [1, M^{(L_2)}]$, $i_p \in [0, M^{(L_2)} - 1]$, $Y^{(L_n)} \in [0, M^{(L_n)} - 1]$, $Y_{FirstDCI}^{(L_1)}$ is the allocation position of the first PDCCH candidate or EPDCCH candidate in AL-$L_1$, $Y_{SecondDCI}^{(L_2)}$ is the allocation position of the second PDCCH candidate or EPDCCH candidate in AL-$L_2$, $M^{(L_n)}$ is the number of PDCCH candidates or EPDCCH candidates in AL-$L_n$, p represents the serial number of the second DCI among the DCIs to be transmitted together with the first DCI, and $Y_k$ is defined in 3GPP TS 36.213.

8. The wireless communication method according to claim 6, wherein
an additional offset parameter is considered in the determination of the allocation position of the second PDCCH candidate or EPDCCH candidate in its AL to randomize a dependency of the allocation position of the second PDCCH candidate or EPDCCH candidate on the first PDCCH candidate or EPDCCH candidate.

9. The wireless communication method according to claim 6, wherein
when the determined allocation position of the second PDCCH candidate or EPDCCH candidate result in blocking, then a different PDCCH candidate or EPDCCH candidate is used as the second PDCCH candidate or EPDCCH candidate.

10. The wireless communication method according to claim 1, wherein
a parameter used in the defined algorithm for determining the assignment of the second PDCCH candidate or EPDCCH candidate is implicitly indicated by one of the allocation position of the first PDCCH candidate or EPDCCH candidate, a scrambling bit in the PDCCH or EPDCCH for the first DCI, and the DCI format of the first DCI, or explicitly indicated by RRC signaling.

11. A wireless communication method performed by a user equipment (UE), comprising steps of:

detecting a first downlink control information (DCI) transmitted from an eNode B (eNB) in a first physical downlink control channel (PDCCH) candidate or enhanced PDCCH (EPDCCH) candidate;

determining an assignment of a second PDCCH candidate or EPDCCH candidate used by the eNB to transmit a second DCI based on an assignment of the first PDCCH candidate or EPDCCH candidate according to a defined algorithm; and detecting the second DCI transmitted from the eNB in the second PDCCH candidate or EPDCCH candidate, wherein the defined algorithm is based on an assignment dependency between the first PDCCH candidate or EPDCCH candidate and the second PDCCH candidate or EPDCCH candidate, and is configured by radio resource control signaling or fixed by specification, wherein an aggregation level (AL) for a group of PDCCH candidate(s) or EPDCCH candidate(s) suitable for transmitting the second DCI is based on an approximation function to approximate one of the possible ALs for the second DCI based on a determined relationship between a desired receiving power per bit of the first DCI and the second DCI according to the defined algorithm.

12. The wireless communication method according to claim 11, comprising:

after determining the group of PDCCH candidate(s) or EPDCCH candidate(s) suitable for transmitting the second DCI, detecting the second DCI in the determined group, and when the second DCI is not successfully detected in the determined group, then blind-detecting PDCCH candidate(s) or EPDCCH candidate(s) outside the determined group.

13. The wireless communication method according to claim 11, comprising:

after determining the group of PDCCH candidate(s) or EPDCCH candidate(s) suitable for transmitting the second DCI, when the total number of PDCCH candidates or EPDCCH candidates in the determined group within UE-specific search space (USS) or common search space (CSS) is smaller than the number of all DCIs determined to be transmitted in the determined group, then detecting the second DCI in a range including a PDCCH candidate or EPDCCH candidate outside the USS or CSS in addition to PDCCH candidates or EPDCCH candidates within the USS or CSS.

14. A wireless communication method performed by a user equipment (UE), comprising steps of:

detecting a first downlink control information (DCI) transmitted from an eNode B (eNB) in a first physical downlink control channel (PDCCH) candidate or enhanced PDCCH (EPDCCH) candidate;

determining an assignment of a second PDCCH candidate or EPDCCH candidate used by the eNB to transmit a second DCI based on an assignment of the first PDCCH candidate or EPDCCH candidate according to a defined algorithm; and detecting the second DCI transmitted from the eNB in the second PDCCH candidate or EPDCCH candidate, wherein the defined algorithm is based on an assignment dependency between the first PDCCH candidate or EPDCCH candidate and the second PDCCH candidate or EPDCCH candidate, and is configured by radio resource control signaling or fixed by specification, wherein said determining the assignment of the second PDCCH candidate or EPDCCH candidate comprises:

determining an allocation position of the second PDCCH candidate or EPDCCH candidate in its aggregation level (AL) is based on the allocation position of the first PDCCH candidate or EPDCCH candidate in its AL according to the defined algorithm, and wherein the defined algorithm includes: a first modulo arithmetic based on the allocation position of the first PDCCH candidate or EPDCCH candidate when the first DCI and the second DCI are in the same AL; and a second modulo arithmetic different from the first modulo arithmetic, the second modulo arithmetic being based on the allocation position of the first PDCCH candidate or EPDCCH candidate when the first DCI and the second DCI are in different ALs.

15. The wireless communication method according to claim 14, wherein after determining the allocation position of the second PDCCH candidate or EPDCCH candidate within its AL, when the second DCI is not successfully detected in the determined allocation position, the method comprises blind-detecting other PDCCH candidates or EPDCCH candidates.

16. An eNode B (eNB) for wireless communication, comprising:

a first transmitter which, in operation, transmits a first downlink control information (DCI) to a user equipment (UE) in a first physical downlink control channel (PDCCH) candidate or enhanced PDCCH (EPDCCH) candidate; and a second transmitter which, in operation, transmits a second DCI to the UE in a second PDCCH candidate or EPDCCH candidate, wherein an assignment of the second PDCCH candidate or EPDCCH candidate is determined based on the assignment of the first PDCCH candidate or EPDCCH candidate according to a defined algorithm, the defined algorithm is based on an assignment dependency between the first PDCCH candidate or EPDCCH candidate and the second PDCCH or EPDCCH candidate, and is configured through radio resource control (RRC) signaling or fixed by specification, wherein an aggregation level (AL) for a group of PDCCH candidate(s) or EPDCCH candidate(s) suitable for transmitting the second DCI is based on an approximation function to approximate one of the possible ALs for the second DCI based on a determined relationship between a desired receiving power per bit of the first DCI and the second DCI according to the defined algorithm.

17. A user equipment (UE) for wireless communication, comprising:

a first detector which, in operation, detects a first downlink control information (DCI) transmitted from an eNode B (eNB) in a first physical downlink control channel (PDCCH) candidate or enhanced PDCCH (EPDCCH) candidate;

determining circuitry which, in operation, determines assignment of a second PDCCH candidate or EPDCCH candidate used by the eNB to transmit a second DCI based on the assignment of the first PDCCH candidate or EPDCCH candidate according to a defined algorithm; and a second detector which, in operation, detects the second DCI transmitted from the eNB in the second PDCCH candidate or EPDCCH candidate, wherein the defined algorithm is based on an assignment dependency between the first PDCCH candidate or EPDCCH candidate and the second PDCCH candidate or EPDCCH candidate, and is configured through radio resource control (RRC) signaling of fixed by specification, wherein an aggregation level (AL) for a group of PDCCH candidate(s) or EPDCCH candidate(s) suitable for transmitting the second DCI is based on an approximation function to approximate one of the possible ALs for the second DCI based on a determined relationship between a desired receiving power per bit of the first DCI and the second DCI according to the defined algorithm.

18. An eNode B (eNB) for wireless communication, comprising:

a first transmitter which, in operation, transmits a first downlink control information (DCI) to a user equipment (UE) in a first physical downlink control channel (PDCCH) candidate or enhanced PDCCH (EPDCCH) candidate; and a second transmitter which, in operation, transmits a second DCI to the UE in a second PDCCH candidate or EPDCCH candidate, wherein an assignment of the second PDCCH candidate or EPDCCH candidate is determined based on the assignment of the first PDCCH candidate or EPDCCH candidate according to a defined algorithm, the defined algorithm is based on an assignment dependency between the first PDCCH candidate or EPDCCH candidate and the second PDCCH or EPDCCH candidate, and is configured through radio resource control (RRC) signaling or fixed by specification, wherein an allocation position of the second PDCCH candidate or EPDCCH candidate in its aggregation level (AL) is determined based on an allocation position of the first PDCCH candidate or EPDCCH candidate in its AL according to the defined algorithm, and wherein the defined algorithm includes:

a first modulo arithmetic based on the allocation position of the first PDCCH candidate or EPDCCH candidate when the first DCI and the second DCI are in the same AL; and a second modulo arithmetic different from the first modulo arithmetic, the second modulo arithmetic being based on the allocation position of the first PDCCH candidate or EPDCCH candidate when the first DCI and the second DCI are in different ALs.

19. A user equipment (UE) for wireless communication, comprising:

a first detector which, in operation, detects a first downlink control information (DCI) transmitted from an eNode B (eNB) in a first physical downlink control channel (PDCCH) candidate or enhanced PDCCH (EPDCCH) candidate;

determining circuitry which, in operation, determines assignment of a second PDCCH candidate or EPDCCH candidate used by the eNB to transmit a second DCI based on the assignment of the first PDCCH candidate or EPDCCH candidate according to a defined algorithm; and a second detector which, in operation, detects the second DCI transmitted from the eNB in the second PDCCH candidate or EPDCCH candidate, wherein the defined algorithm is based on an assignment dependency between the first PDCCH candidate or EPDCCH candidate and the second PDCCH candidate or EPDCCH candidate, and is configured through radio resource control (RRC) signaling of fixed by specification, wherein an allocation position of the second PDCCH candidate or EPDCCH candidate in its aggregation level (AL) is determined based on an allocation position of the first PDCCH candidate or EPDCCH candidate in its AL according to the defined algorithm, and wherein the defined algorithm includes:

a first modulo arithmetic based on the allocation position of the first PDCCH candidate or EPDCCH candidate when the first DCI and the second DCI are in the same AL; and a second modulo arithmetic different from the first modulo arithmetic, the second modulo arithmetic being based on the allocation position of the first PDCCH candidate or EPDCCH candidate when the first DCI and the second DCI are in different ALs.

* * * * *